US007881082B2

(12) United States Patent
Sato (10) Patent No.: US 7,881,082 B2
(45) Date of Patent: Feb. 1, 2011

(54) POWER CONVERSION APPARATUS AND METHOD OF CONTROLLING THE SAME

(75) Inventor: Makoto Sato, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 237 days.

(21) Appl. No.: 11/877,157

(22) Filed: Oct. 23, 2007

(65) Prior Publication Data

US 2008/0101103 A1 May 1, 2008

(30) Foreign Application Priority Data

Oct. 25, 2006 (JP) ............................. 2006-289773

(51) Int. Cl.
*H02M 7/539* (2006.01)
*H02M 3/335* (2006.01)
(52) U.S. Cl. .................................... 363/97; 363/21.03
(58) Field of Classification Search ............. 363/21.02, 363/21.03, 21.04, 21.12, 56.09–56.11, 97, 363/131
See application file for complete search history.

(56) References Cited

U.S. PATENT DOCUMENTS

| 5,699,238 | A | * | 12/1997 | Lee et al. .................. 363/21.03 |
| 5,986,895 | A | * | 11/1999 | Stewart et al. ................ 363/16 |
| 6,934,167 | B2 | * | 8/2005 | Jang et al. ................. 363/21.02 |
| 7,339,800 | B2 | * | 3/2008 | Fukumoto ................. 363/21.02 |
| 2005/0226010 | A1 | * | 10/2005 | Durbaum et al. ......... 363/21.02 |
| 2006/0291117 | A1 | * | 12/2006 | Kyono .......................... 361/90 |

FOREIGN PATENT DOCUMENTS

| JP | 8-66025 | 3/1996 |
| JP | 11-164554 | 6/1999 |
| JP | 2005-143255 | 6/2005 |

* cited by examiner

*Primary Examiner*—Jeffrey L Sterrett
*Assistant Examiner*—Fred E Finch, III
(74) *Attorney, Agent, or Firm*—Oblon, Spivak, McClelland, Maier & Neustadt, L.L.P.

(57) ABSTRACT

A power conversion apparatus includes a series circuit having a first switching element and a second switching element, the series circuit being connected to a DC power source in parallel, a resonant circuit including a capacitor and a primary winding of a transformer, the resonant circuit being connected to one of the first and second switching elements in parallel, an intermittent signal generator, a controller to control the start and stop of a switching operation of the first and second switching elements according to the intermittent signal, a current detector to detect a resonant current passing through the resonant circuit, and a timing generator to generate a timing signal when the detected resonant current satisfies a resonant condition. After the switching operation of the first and second switching elements is suspended according to the intermittent signal, the controller resumes the switching operation in response to the timing signal.

3 Claims, 7 Drawing Sheets

FIG. 1

PRIOR ART

PRIOR ART

POWER CONVERSION APPARATUS AND METHOD OF CONTROLLING THE SAME

BACKGROUND OF THE INVENTION

1. Field of the Invention

The present invention relates to a current-resonant power conversion apparatus employing a switching system and a method of controlling such a power conversion apparatus. In particular, the present invention relates to a technique of improving the conversion efficiency of a power conversion apparatus in a light-load or no-load state.

2. Description of the Related Art

There is a switching power source apparatus employing a current-resonant power conversion apparatus. The current-resonant power conversion apparatus maintains a current resonance during a steady load state, to achieve zero-current switching (ZCS) and zero-voltage switching (ZVS) and realize low-noise, high-efficient power conversion.

The current-resonant power conversion apparatus always passes a resonant current without regard to a load condition. Namely, even during a standby state or the like in which there is light load or no load, the apparatus constantly passes a resonant current to cause a power loss to extremely deteriorate the power conversion efficiency of the apparatus. To improve the power conversion efficiency during a light-load or no-load condition, Japanese Unexamined Patent Application publication No. 2005-143255 (herein after referred to as Document D3) discloses a power conversion apparatus that performs an intermittent power conversion operation by temporarily stopping a power conversion operation (switching operation) during a light-load condition or no-load condition. The resonant-type power conversion apparatus that carries out such an intermittent power conversion operation is hereinafter referred to as "resonant power conversion apparatus with intermittent oscillation mode."

Figure 1:
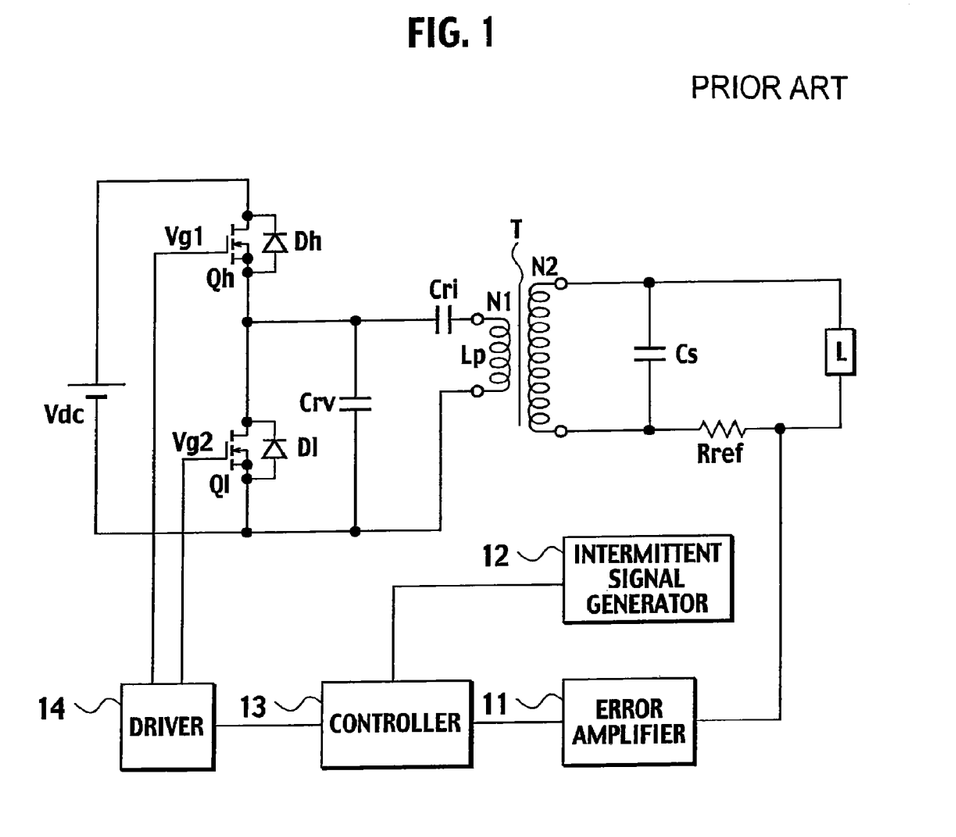
FIG. 1 is a block diagram showing a lamp lighting apparatus employing a resonant power conversion apparatus with intermittent oscillation mode according to a related art.

FIG. 1 is a block diagram showing a lamp lighting apparatus employing a resonant power conversion apparatus with intermittent oscillation mode according to a related art. The lamp lighting apparatus includes a DC power source Vdc and a series circuit connected between ends of the DC power source Vdc, the series circuit consisting of a high-side switching element Qh and a low-side switching element Ql. The switching elements Qh and Ql are, for example, MOSFETs. The DC power source Vdc consists of a rectifying-smoothing circuit that includes a diode bridge rectifier for rectifying commercial AC power and a smoothing capacitor for smoothing the output of the diode bridge rectifier (not shown in FIG. 1).

Between the source and drain of the high-side switching element Qh, a high-side clamping diode Dh is connected. The diode Dh may be replaced with a parasitic diode of the high-side switching element Qh. Between the source and drain of the low-side switching element Ql, a low-side clamping diode Dl is connected. The diode Dl may be replaced with a parasitic diode of the low-side switching element Ql.

Between the source and drain of the low-side switching element Ql, a voltage resonant capacitor Crv is connected. The capacitor Crv may be replaced with a parasitic capacitance of the high- and low-side switching elements Qh and Ql.

Between the source and drain of the low-side switching element Ql, an LC series resonant circuit (hereinafter referred to simply as "resonant circuit") is connected. The resonant circuit includes a resonant capacitor Cri on the primary side of a transformer T and a primary winding N1 of the transformer T. As is well known, the transformer T includes an exciting inductance Lp and a leakage inductance Lr (not shown).

The transformer T has a secondary winding N2 whose ends are connected to an output circuit. The output circuit includes a resonant capacitor Cs on the secondary side of the transformer T. Ends of the resonant capacitor Cs are connected to a current detecting resistor Rref and a load L. The load L is a lamp. Between the load L and the resistor Rref, an error amplifier 11 is connected. The error amplifier 11 receives a voltage from a connection point of the resistor Rref and load L, compares the received voltage with a reference voltage, and outputs an error voltage that is sent to a controller 13.

To intermittently control power conversion, an intermittent signal generator 12 is arranged. The intermittent signal generator 12 generates an intermittent signal of instructing an intermittent operation and sends the signal to the controller 13. The intermittent signal is high when the load L (lamp) is ON and is low when the lamp is OFF. An OFF period or a low-level period of the intermittent signal is determined according to an external instruction or the state of the load L.

If the intermittent signal from the intermittent signal generator 12 indicates a steady load (i.e. not light condition nor no-load condition), the controller 13 generates a control signal whose pulse width (ON width) is proportional to the error voltage from the error amplifier 11, to alternately turn on/off the high- and low-side switching elements Qh and Ql. The control signal is sent to a driver 14.

If the intermittent signal from the intermittent signal generator 12 indicates light-load condition or no-load condition, the controller 13 generates a control signal to suspend the switching (on/off) operation of the high-side and low-side switching elements Qh and Ql without regard to the error voltage from the error amplifier 11 and sends the control signal to the driver 14.

According to the control signal from the controller 13, the driver 14 generates drive signals, i.e., gate signals Vg1 and Vg2 and supplies them to the gates of the high- and low-side switching elements Qh and Ql, respectively.

Operation of the lamp lighting apparatus according to the related art will be explained with reference to operational waveforms shown in FIG. 2. Operation under a steady load (operation up to t0 of FIG. 2) is well known to persons skilled in the art, and therefore, will not be explained.

Figure 2:
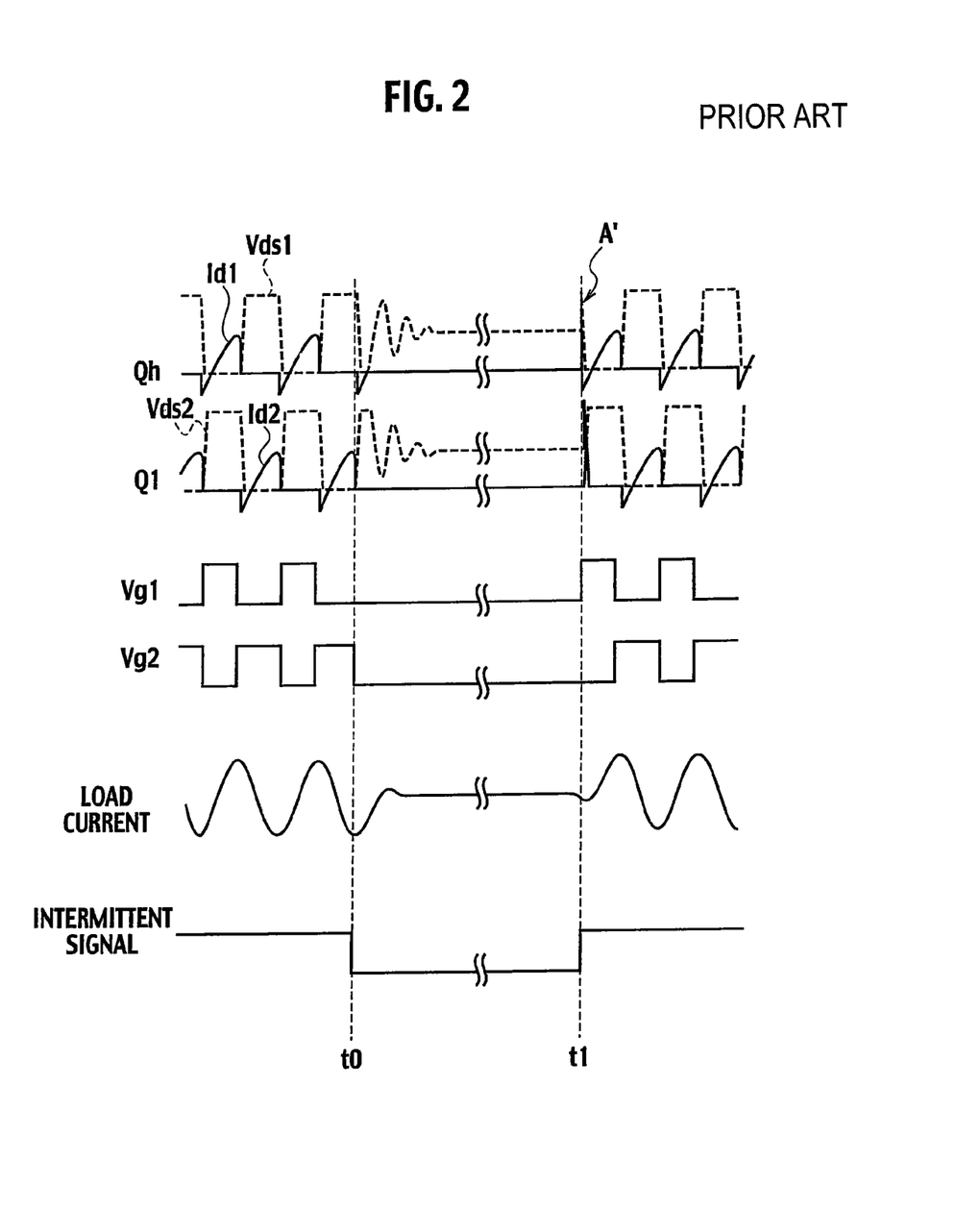
FIG. 2 is a view showing operational waveforms of the apparatus of FIG. 1.

The waveforms shown in FIG. 2 include a drain-source voltage Vds1 of the high-side switching element Qh, a drain current Id1 of the same, a drain-source voltage Vds2 of the low-side switching element Ql, a drain current Id2 of the same, the gate signal Vg1 to the gate of the high-side switching element Qh, the gate signal Vg2 to the gate of the low-side switching element Ql, a load current to the load L, and the intermittent signal from the intermittent signal generator 12.

According to the related art, the switching operation of the high-side and low-side switching elements Qh and Ql is suspended during a suspension period in which the intermittent signal is low (from t0 to t1). The suspension is achieved by lowering both the gate signal Vg1 to the high-side switching element Qh and the gate signal Vg2 to the low-side switching element Ql.

Figure 3:
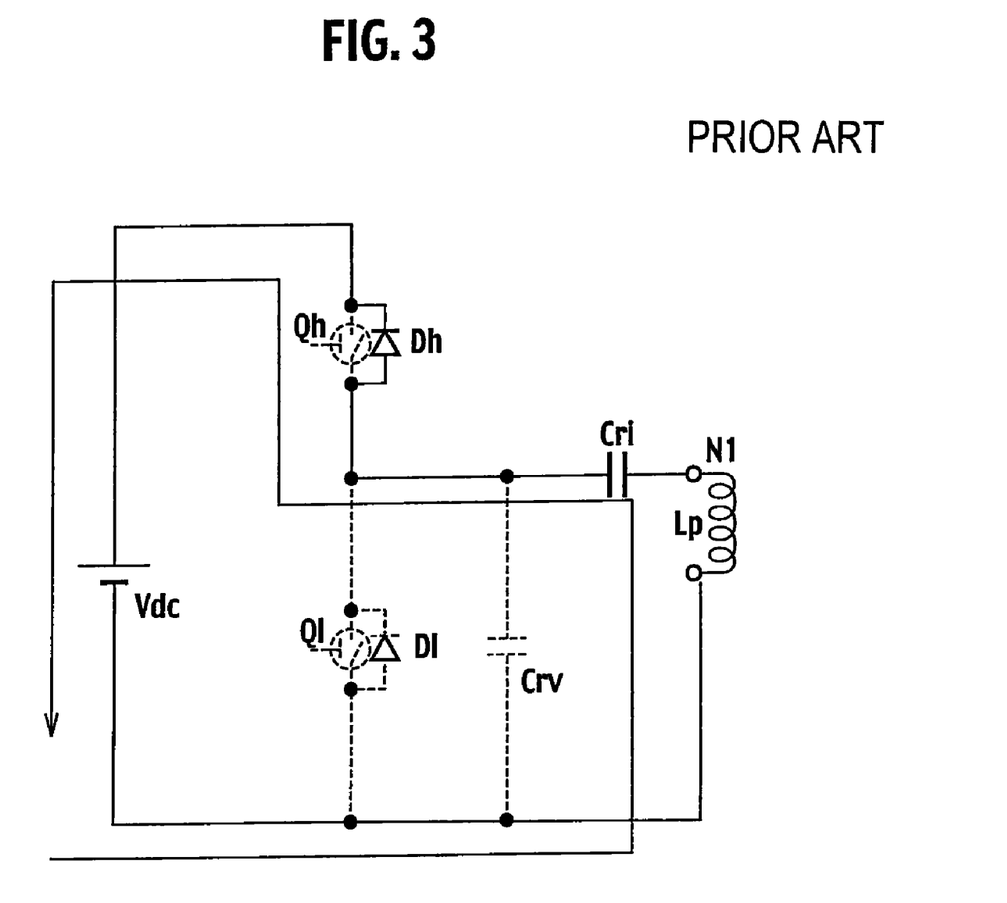
FIG. 3 is a view showing a current path during a suspension period of the apparatus of FIG. 1.

When the switching operation is suspended, the resonant circuit including the inductance Lp and resonant capacitor Cri holds energy. This energy results in a current passing through a path extending along Lp, Cri, Dh, Vdc, and Lp and is mostly consumed by regeneration at the DC power source Vdc to damp the resonance immediately.

With no energy being left in the resonant circuit, the switching operation is continuously suspended. At t1, the intermittent signal generator 12 raises the intermittent signal to trigger a start of oscillation. In response to this, the controller 13 sends a control signal to instruct the driver 14 to resume the switching operation of the high- and low-side switching elements Qh and Ql.

The lamp lighting apparatus of this related art controls a voltage supplied to the load L, and at the same time, intermittently conducts power conversion by intermittently suspending the switching operation of the high- and low-side switching elements Qh and Ql. The related art is simply configured to control an output, reduce an average power consumption, and improve a conversion efficiency.

Another related art is disclosed in Japanese Unexamined Patent Application Publication No. 8-66025 (hereinafter referred to as Document D1). This disclosure is a resonant-type switching power source apparatus employing a half bridge configuration that is compact, low-cost, and noise-resistive. The apparatus includes a DC power source and a series circuit connected to the DC power source, the series circuit including first and second transistors. In parallel with the second transistor, a primary winding of a transformer is connected. In series with the primary winding, a series resonant capacitor and an inductance are connected. The first transistor has no parallel auxiliary capacitor and only the second transistor is connected to an auxiliary capacitor in parallel.

Japanese Unexamined Patent Application Publication No. 11-164554 (hereinafter referred to as Document D2) discloses a current-resonant power source circuit. According to the disclosure, a range in which the operation frequencies of charge and discharge switching units are higher than a resonant frequency is extended toward a lower band side. The two switching units are turned on/off to resonate a primary winding of a switching transformer and a current resonant capacitor. In response to the resonance, a secondary winding of the switching transformer provides a high-frequency output. The current resonant capacitor is selected so that the capacitance thereof increases as the operation frequencies of the two switching units decrease.

The Japanese Unexamined Patent Application Publication No. 2005-143255 (Document D3) mentioned above also discloses a method of controlling a resonant power source apparatus. The method is capable of immediately stopping the resonance of a resonant circuit as soon as an active state is stopped. According to the method, the resonant circuit is arranged on the primary side of a transformer and a resonant current passing through the resonant circuit is controlled by driving a switching unit. The secondary side of the transformer is connected to an output circuit. During a driving state of the resonant power source apparatus, the switching unit is driven to keep the resonant current at a predetermined amplitude so that the output circuit may output a constant voltage. To stop the resonant power source apparatus, the switching unit is driven in a phase opposite to the driving state, so that the resonant current may have a zero amplitude.

SUMMARY OF THE INVENTION

The resonant power conversion apparatus with intermittent oscillation mode according to the related art shown in FIG. 1 has a problem. When a suspension period ends, the intermittent signal generator 12 raises the intermittent signal to high. According to this signal, one of the high-side switching element Qh and low-side switching element Ql is turned on to start a switching operation.

Energy remaining in the resonant circuit is mostly consumed by regeneration at the DC power source Vdc, to terminate a resonance. Due to this, the resumption of switching operation is always a hard switching operation without regard to which of the high-side and low-side switching elements Qh and Ql is turned on at the resumption. Namely, according to the intermittent power conversion (switching operation) of the related art, a resonance disappears before resumption from a suspended state, as shown in FIG. 2. This forces a hard switching operation at the resumption from a suspended state, to pass a large surge current as depicted by "A'" in FIG. 2. The surge current produces a surge voltage to cause noise. At this time, a large voltage is applied to the switching elements to enlarge load on the switching elements and deteriorate the reliability of the switching elements.

Once a resonance disappears, the zero-current switching and zero-voltage switching will never be performed. This results in greatly increasing a switching loss and power loss to deteriorate power conversion efficiency.

A subject matter of the present invention is to provide a power conversion apparatus capable of achieving a high power-conversion efficiency even under a light-load or no-load condition and a method of controlling such an apparatus.

According to a first aspect of the present invention, a power conversion apparatus has a series circuit including a first switching element and a second switching element, the series circuit being connected to a DC power source in parallel; a resonant circuit including a capacitor and a primary winding of a transformer, the resonant circuit being connected to one of the first and second switching elements in parallel; an intermittent signal generator configured to generate an intermittent signal of triggering an intermittent operation according to an external instruction or a load condition connected to a secondary winding of the transformer; a controller configured to control, according to the intermittent signal from the intermittent signal generator, the start and stop of a switching operation of the first and second switching elements; a current detector configured to detect a resonant current passing through the resonant circuit; and a timing generator configured to generate a timing signal when the resonant current detected by the current detector satisfies a resonant condition. After the switching operation of the first and second switching elements is suspended according to the intermittent signal from the intermittent signal generator, the controller resumes the switching operation in response to the timing signal from the timing generator.

According to a second aspect of the present invention that is based on the first aspect, during a suspension period in which the switching operation of the first and second switching elements is suspended according to the intermittent signal from the intermittent signal generator, the controller keeps one of the first and second switching elements in an ON state and the other in an OFF state.

According to a third aspect of the present invention that is based on the second aspect, the timing generator generates the timing signal when a positive period is detected in the resonant current passing through the ON-state one of the first and second switching elements during the suspension period. In response to the timing signal from the timing generator, the controller turns on the OFF-state one of the first and second switching elements and off the ON-state one.

According to a fourth aspect of the present invention that is based on the first aspect, the current detector detects the resonant current from a voltage of one of the transformer and capacitor that form the resonant circuit.

A fifth aspect of the present invention provides a method of controlling a power conversion apparatus that includes a series circuit having a first switching element and a second switching element, the series circuit being connected to a DC power source in parallel, a resonant circuit including a capacitor and a primary winding of a transformer, the resonant circuit being connected to one of the first and second switching elements in parallel, an intermittent signal generator configured to generate an intermittent signal of triggering an intermittent operation according to an external instruction or a load condition connected to a secondary winding of the transformer, and a controller configured to control, according to the intermittent signal from the intermittent signal generator, the start and stop of a switching operation of the first and second switching elements. The method includes detecting a resonant current passing through the resonant circuit, generating a timing signal when the detected resonant current satisfies a resonant condition, and after the switching operation of the first and second switching elements is suspended according to the intermittent signal from the intermittent signal generator, resuming the switching operation in response to the generated timing signal.

DESCRIPTION OF THE PREFERRED EMBODIMENT

Power conversion apparatuses and methods of controlling a power conversion apparatus according to embodiments of the present invention will be explained with reference to the accompanying drawings.

First Embodiment

Figure 4:
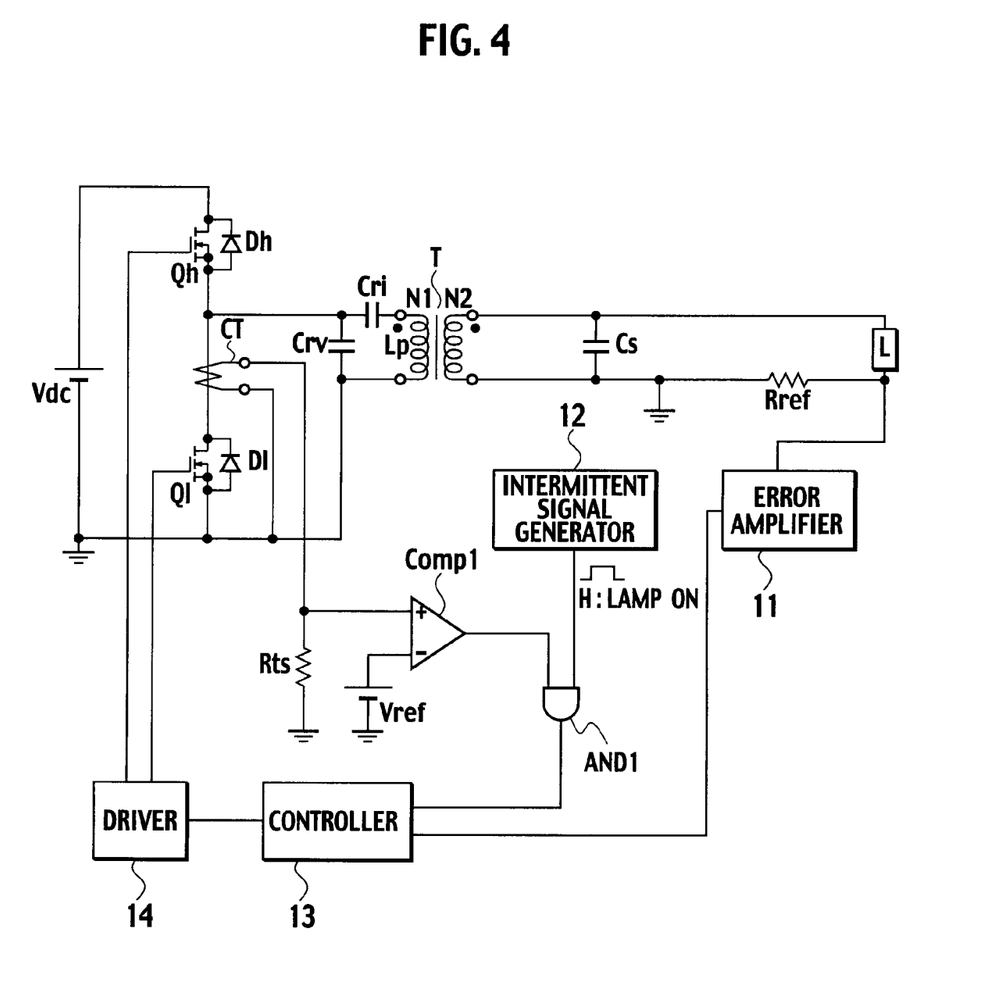
FIG. 4 is a block diagram showing a lamp lighting apparatus employing a resonant power conversion apparatus with intermittent oscillation mode according to a first embodiment of the present invention.

FIG. 4 is a block diagram showing a lamp lighting apparatus employing a resonant power conversion apparatus with intermittent oscillation mode according to the first embodiment of the present invention. In FIG. 4, a high-side switching element Qh serves as a first switching element according to the present invention and a low-side switching element Ql as a second switching element.

The lamp lighting apparatus of the present embodiment includes, in addition to the components of the lamp lighting apparatus of the related art shown in FIG. 1, a current transformer CT, a resistor Rts, a reference voltage source Vref, a comparator Comp1, and an AND circuit AND1. In the following explanation, the parts same or similar to those of the related art of FIG. 1 are represented with like reference marks to omit the explanation thereof. Only components that are different from or additional to those of the related art will be explained in detail.

The current transformer CT detects a resonant current passing through a line that connects the high- and low-sides witching elements Qh and Ql to each other. More precisely, the current transformer CT passes a current proportional to a resonant current and the resistor Rts converts the proportional current into a voltage that is applied to a non-inverting input terminal of the comparator Comp1.

The comparator Comp1 compares the voltage outputted from the resistor Rts with a reference voltage of the reference voltage source Vref and provides a signal indicative of the comparison result. This signal is supplied to a first input terminal of the AND circuit AND1.

The current transformer CT, resistor Rts, reference voltage source Vref, and comparator Comp1 serve as a current detector according to the present invention. Instead of the current transformer CT, the current detector according to the present invention may be realized by inserting a resistor in the line that connects the high-side and low-side switching elements Qh and Ql to each other and by supplying a voltage generated by the resistor to the non-inverting input terminal of the comparator Comp1. This arrangement is advantageous in simplifying a circuit configuration and lowering the cost.

The AND circuit AND1 serves as a timing generator according to the present invention. The AND circuit AND1 performs an AND operation of an intermittent signal from an intermittent signal generator 12 and a signal from the comparator Comp1 and sends the result of the AND operation as a timing signal to a controller 13. The AND circuit AND1 generates the timing signal when the resonant current detected by the current detector satisfies a resonant condition.

In response to the timing signal, the controller 13 resumes a switching operation of the high-side and low-side switching elements Qh and Ql, the switching operation being suspended according to the intermittent signal from the intermittent signal generator 12.

Operation of the resonant power conversion apparatus with intermittent oscillation mode according to the present embodiment of the present invention will be explained with reference to FIG. 5. Operation of the apparatus in a steady load state (up to t0) is well known to persons skilled in the art and is explained in, for example, the documents D1, D2, and D3. Accordingly, the steady load operation will not be explained here.

Figure 5:
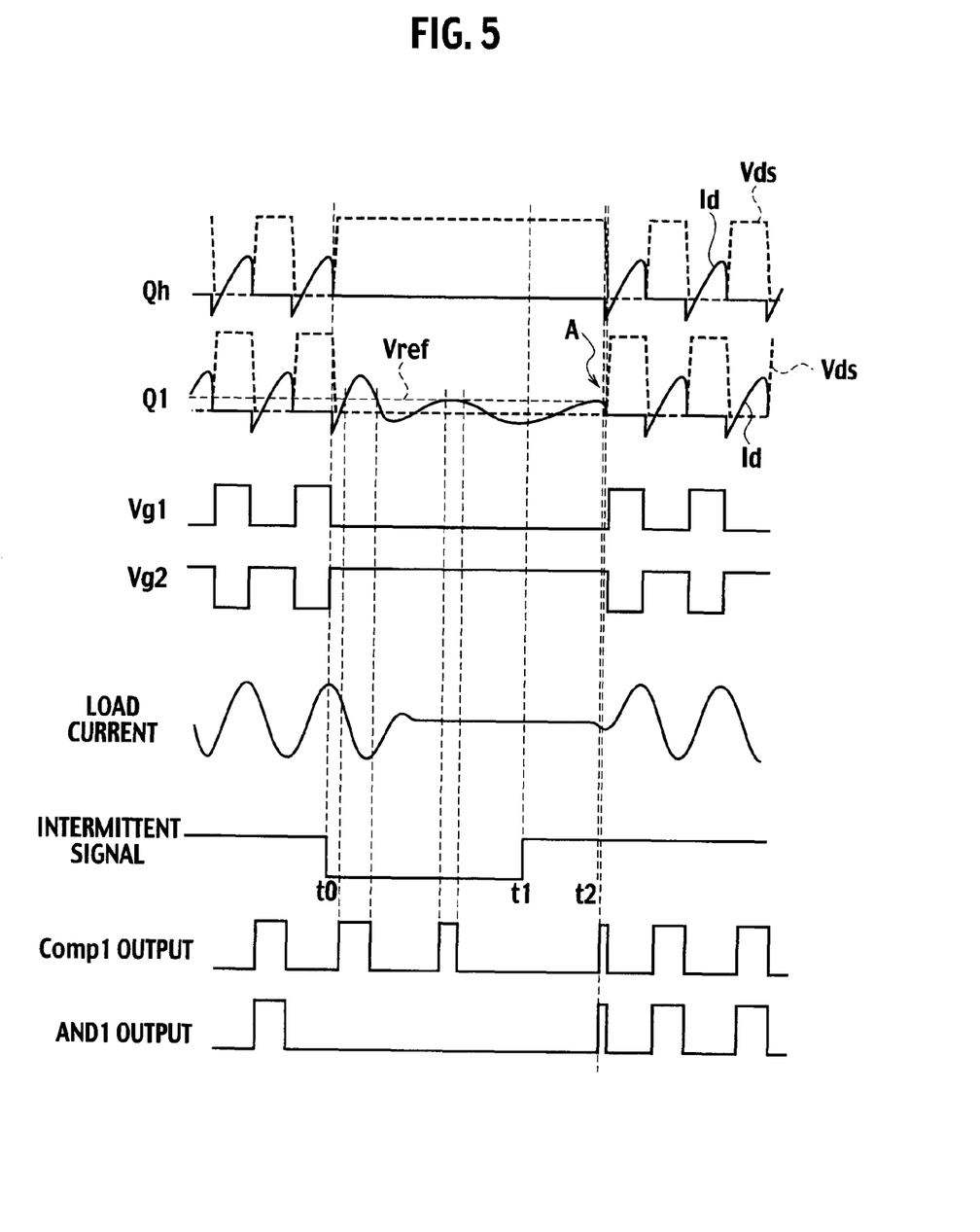
FIG. 5 is a view showing operational waveforms of the apparatus of FIG. 4.

FIG. 5 shows waveforms of a drain-source voltage Vds1 of the high-side switching element Qh, a drain current Id1 of the same, a drain-source voltage Vds2 of the low-side switching element Ql, a drain current Id2 of the same, a gate signal Vg1 to the gate of the high-side switching element Qh, a gate signal Vg2 to the gate of the low-side switching element Ql, a load current passed to a load L, an intermittent signal from the intermittent signal generator 12, an output signal from the comparator Comp1, and an output signal from the AND circuit AND1.

Figure 6:
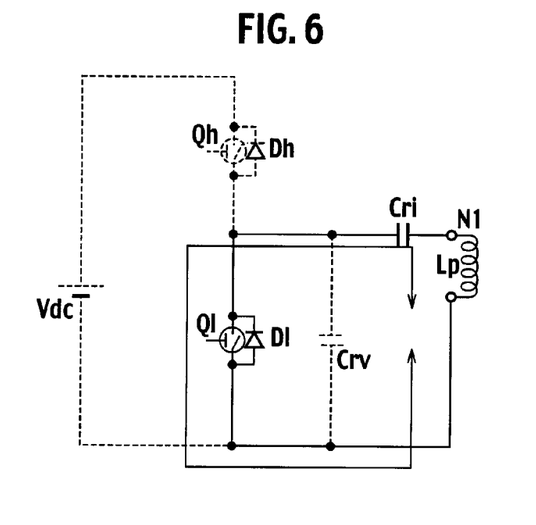
FIG. 6 is a view showing a current path during a suspension period of the apparatus of FIG. 4.

In FIG. 5, the intermittent signal drops to low at t0 to stop the switching operation of the high-side and low-side switching elements Qh and Ql with the element Qh being in an OFF state and the element Ql in an ON state. At this time, energy remaining in a resonant circuit causes a current passing clockwise through a first path extending along Lp, Cri, Dl, and Lp as shown in FIG. 6 and a current passing counterclockwise through a second path extending a long Lp, Ql, Cri, and Lp as shown in FIG. 6. These currents alternately pass through the first and second paths, to produce a ringing current as shown in Ql of FIG. 5. The ringing current oscillates and gradually attenuates due to resistance components existing in the first and second paths. If the elements are ideal elements, the ringing current infinitely oscillates.

In a period in which the ringing current is passing, the comparator Comp1 provides a pulse only when a voltage representative of the ringing current becomes higher than the reference voltage from the reference voltage source Vref. At this time, the intermittent signal from the intermittent signal generator 12 is low, and therefore, the output of the AND circuit AND1 keeps low not to activate the controller 13.

At time t1, the intermittent signal changes to high. Even so, the output of the comparator Comp1 keeps low because the voltage representative of the ringing current is still lower than the reference voltage. As a result, the output of the AND circuit AND1 is low and the controller 13 is inoperative. At t2, the voltage representative of the ringing current exceeds the reference voltage and the output of the comparator Comp1 becomes high. As a result, the AND circuit AND1 provides a timing signal of high level to activate the controller 13. It is preferable to set the reference voltage from the reference voltage source Vref so that the comparator Comp1 may provide a pulse when a voltage representative of a ringing current nearly reaches a peak.

In this way, the switching operation of the high-side and low-side switching elements Qh and Ql each has been suspended when the intermittent signal drops to low is not resumed even if the intermittent signal changes to high, if no ringing current passes through the first path. When a ringing current passes through the first path to pass a positive current to the low-side switching element Ql and produce a pseudo resonance by satisfying the resonant condition, the switching operation is restarted by turning off the low-side switching element Ql that has kept an ON state during the suspension period. This establishes a voltage pseudo resonance to suppress surge and noise as depicted by "A" in FIG. 5.

When the low-side switching element Ql that has kept an ON state during the suspension period is turned off, the ringing current is unable to pass through the first path of Lp, Cri, Dl, and Lp, and therefore, passes through a high-side diode Dh instead of the low-side switching element Ql. Namely, the path for passing the ringing current changes and the ringing current passes counterclockwise through a path extending along Lp, Cri, Dh, Vdc, and Lp. While the ringing current is passing through this path, the controller 13 activates the gate signal Vg1 to the high-side switching element Qh. This results in realizing zero-current switching like that in the steady operation.

According to the first embodiment, the switching operation, i.e., the power conversion operation is suspended with the high-side switching element Qh being in an OFF state and the low-side switching element Ql in an ON state. To the contrary, the power conversion operation may be suspended with the high-side switching element Qh being in an ON state and the low-side switching element Ql in an OFF state.

In this case, a ringing current during the suspension period alternately passes counterclockwise through a third path extending along Lp, Cri, Qh, Vdc, and Lp and clockwise through a fourth path extending along Lp, Vdc, Qh, Cri, and Lp. By detecting the ringing current passing through the fourth path, i.e., by detecting a positive current passing through the high-side switching element Qh, the high-side switching element Qh is turned off to establish a voltage pseudo resonance and suppress surge and noise.

When the high-side switching element Qh that has kept an ON state during the suspension period is turned off, the ringing current is unable to pass through the third path of Lp, Cri, Qh, Vdc, and Lp, and therefore, passes through the low-side diode D1 instead of the high-side switching element Qh. Namely, the path of the ringing current changes and the ringing current passes through a path extending along Lp, Dl, Cri, and Lp. While the ringing current is passing through this path, the controller 13 activates the gate signal Vg2 to the low-side switching element Ql, to realize zero-current switching as in the steady operation.

In this way, the power conversion apparatus according to the first embodiment of the present invention can secure a resonance during an intermittent operation, to reduce noise and improve efficiency. Unlike the resonant power conversion apparatuses of the related arts that are incapable of securing a resonance during an intermittent operation, the power conversion apparatus of the first embodiment of the present invention can secure a resonance even during an intermittent operation, to prevent a surge voltage and decrease the withstand voltage of each switching element. As a result, the apparatus according to the first embodiment is inexpensive and highly efficient. In addition, the apparatus according to the first embodiment always achieves soft switching to suppress noise.

Modifications

Figure 7:
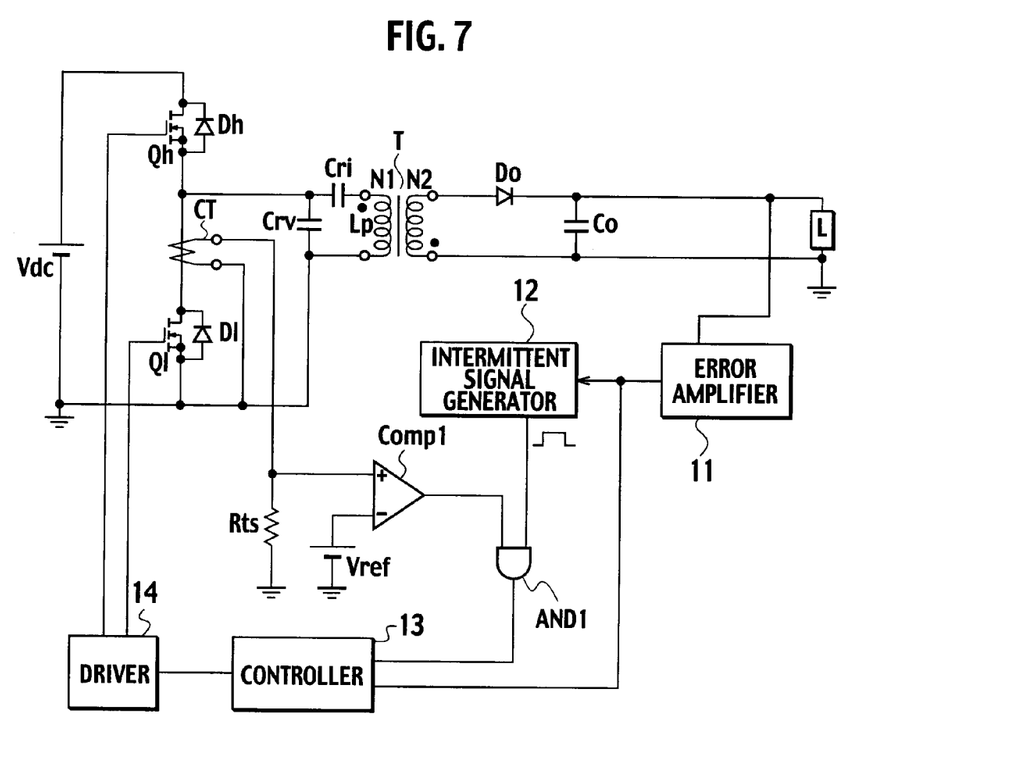
FIG. 7 is a view showing a lamp lighting apparatus employing a resonant power conversion apparatus with intermittent oscillation mode according to a modification of the first embodiment of the present invention.

The power conversion apparatus according to the first embodiment of the present invention functions as an inverter of a lamp lighting apparatus. The present invention is applicable not only to inverters but also to converters by employing a rectifier in an output circuit on a secondary side. FIG. 7 is a block diagram showing a converter having a half-wave rectifier in an output circuit arranged on a secondary side, according to a modification of the first embodiment of the present invention. The half-wave rectifier is a series circuit connected to a secondary winding N2 of a transformer T in parallel, the series circuit including a diode Do and a capacitor Co. Ends of the capacitor Co are connected to a load L.

In FIG. 7, an error amplifier 11 receives a voltage from the capacitor Co, compares the received voltage with a reference voltage, and outputs an error voltage. The error voltage is supplied to an intermittent signal generator 12 and a controller 13. The intermittent signal generator 12 generates an intermittent signal whose low-level period is determined by the error voltage from the error amplifier 11 and sends the intermittent signal to an AND circuit AND1. This modification provides the same effect as the first embodiment.

Figure 8:
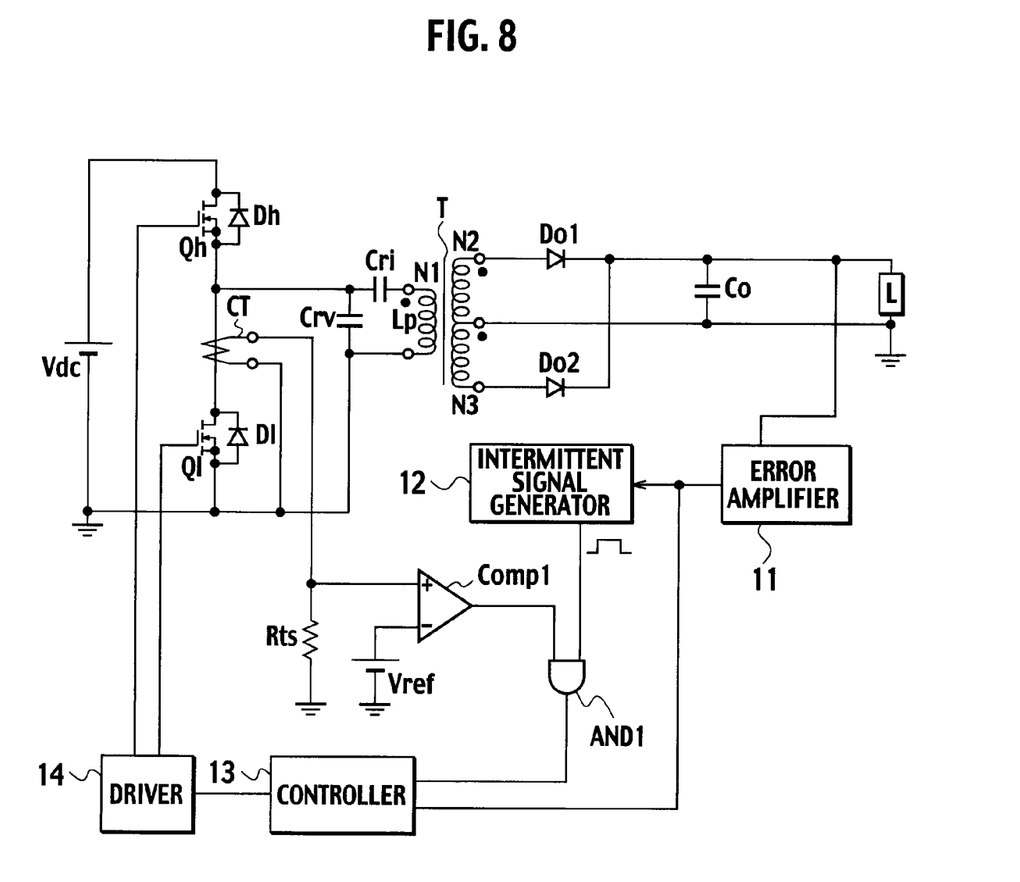
FIG. 8 is a view showing a lamp lighting apparatus employing a resonant power conversion apparatus with intermittent oscillation mode according to another modification of the first embodiment of the present invention.

FIG. 8 is a block diagram showing a converter according to another modification of the first embodiment of the present invention. This converter has a full-wave rectifier in an output circuit arranged on a secondary side. The full-wave rectifier includes a series circuit and a diode Do2. The series circuit is connected between a first terminal of a secondary winding N2 of a transformer T and a neutral terminal of the secondary winding N2/N3 and includes a diode Do1 and a capacitor Co. The diode Do2 is connected between a second terminal of the secondary winding N3 and a cathode of the diode Do1. This modification provides the same effect as the first embodiment and greatly reduces a ripple component in an output voltage.

According to the first embodiment of the present invention, the current transformer CT is used to detect a resonant current. Instead, the resonant current can be detected from a voltage of the primary winding N1 of the transformer T in the resonant circuit, or from a voltage of the resonant capacitor Cri on the primary side.

According to the power conversion apparatus of the present invention, the current detector detects a current passing through the resonant circuit during a suspension of power conversion operation of the apparatus. When the detected current satisfies a resonant condition, the switching (on/off)

operation of the first and second switching elements is resumed from the suspended state. Accordingly, until the power conversion operation is restarted after a suspension period, a current resonance is maintained to realize zero-current switching and zero-voltage switching. The apparatus, therefore, can efficiently perform the power conversion operation without causing noise. In addition, the apparatus can improve a power conversion efficiency in a light-load or no-load state.

The power conversion apparatus and method of controlling the same according to the present invention are applicable to inverters and converters that must be low-noise and highly efficient.

This application claims benefit of priority under 35 USC §119 to Japanese Patent Application No. 2006-289773, filed on Oct. 25, 2006, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A power conversion apparatus, comprising:
    a series circuit including a first switching element and a second switching element, the series circuit being connected to a DC power source in parallel;
    a resonant circuit including a capacitor and a primary winding of a transformer, the resonant circuit being connected to one of the first and second switching elements in parallel;
    an intermittent signal generator configured to generate an intermittent signal of triggering an intermittent operation according to a state of a load connected to a secondary winding of the transformer;
    a controller configured to drive the first and second switching elements during a steady period and to control the start and stop of a switching operation of the first and second switching elements according to the intermittent signal from the intermittent signal generator during a suspension period in which the switching operation of the first and second switching elements is suspended according to the intermittent signal from the intermittent signal generator;
    a current detector configured to detect a resonant current passing through the resonant circuit; and
    a timing generator configured to generate a timing signal when the resonant current detected by the current detector satisfies a resonant condition, wherein,
    after the switching operation of the first and second switching elements is suspended according to the intermittent signal from the intermittent signal generator, the controller resumes the switching operation in response to the timing signal from the timing generator,
    during the suspension period, the controller keeps one of the first and second switching elements in an ON state and the other in an OFF-state,
    the timing generator generates the timing signal when a positive period is detected in the resonant current passing through the ON-state one of the first and second switching elements during the suspension period, and,
    in response to the timing signal from the timing generator, the controller turns on the OFF-state one of the first and second switching elements and off the ON-state one.

2. The apparatus of claim 1, wherein:
    the current detector detects the resonant current from a voltage of one of the transformer and capacitor that form the resonant circuit.

3. A method of controlling a power conversion apparatus that includes a series circuit having a first switching element and a second switching element, the series circuit being connected to a DC power source in parallel, a resonant circuit including a capacitor and a primary winding of a transformer, the resonant circuit being connected to one of the first and second switching elements in parallel, an intermittent signal generator configured to generate an intermittent signal of instructing an intermittent operation according to one of an external instruction and a load connected to a secondary winding of the transformer, and a controller configured to drive the first and second switching elements during a steady period and to control, according to the intermittent signal from the intermittent signal generator, the start and stop of a switching operation of the first and second switching elements, during a suspension period in which the switching operation of the first and second switching elements is suspended according to the intermittent signal from the intermittent signal generator, the method comprising:
    detecting a resonant current passing through the resonant circuit;
    generating a timing signal when the detected resonant current satisfies a resonant condition; and
    after the switching operation of the first and second switching elements is suspended according to the intermittent signal from the intermittent signal generator, resuming the switching operation in response to the generated timing signal,
    during the suspension period, the controller keeps one of the first and second switching elements in an ON state and the other in an OFF-state,
    the timing generator generates the timing signal when a positive period is detected in the resonant current passing through the ON-state one of the first and second switching elements during the suspension period, and,
    in response to the timing signal from the timing generator, the controller turns on the OFF-state one of the first and second switching elements and off the ON-state one.

* * * * *